United States Patent
Ahn et al.

(10) Patent No.: US 12,427,895 B2
(45) Date of Patent: Sep. 30, 2025

(54) METHOD AND SYSTEM FOR CONTROLLING DISPLAY VIEWING ENVIRONMENT IN VEHICLE

(71) Applicant: HYUNDAI MOBIS CO., LTD., Seoul (KR)

(72) Inventors: Sung Joon Ahn, Seongnam-si (KR); Ji Soo Shin, Yongin-si (KR); Shin Jik Lee, Hwaseong-si (KR); Kyung Hoon Kim, Yongin-si (KR); Hyun Jun An, Gunpo-si (KR); Tae Hun Kim, Seongnam-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 333 days.

(21) Appl. No.: 17/989,010

(22) Filed: Nov. 17, 2022

(65) Prior Publication Data

US 2023/0406100 A1 Dec. 21, 2023

(30) Foreign Application Priority Data

Jun. 16, 2022 (KR) .......................... 10-2022-0073416

(51) Int. Cl.
*B60K 35/00* (2024.01)
*B60K 35/10* (2024.01)
(Continued)

(52) U.S. Cl.
CPC ............ *B60K 35/00* (2013.01); *B60N 2/0224* (2013.01); *B60K 35/10* (2024.01); *B60K 35/22* (2024.01);
(Continued)

(58) Field of Classification Search
CPC .............. B60N 2/02246; B60N 2/0244; B60N 2/0224; B60N 2/16; B60N 2/01;
(Continued)

(56) References Cited

U.S. PATENT DOCUMENTS

| 11,345,261 B2 * | 5/2022 | Yogo ...................... B60N 2/995 |
| 2015/0130759 A1 * | 5/2015 | Heo ...................... G06F 3/0482 |
| | | 345/174 |

(Continued)

FOREIGN PATENT DOCUMENTS

| CN | 106570452 A | * | 4/2017 | |
| CN | 112462566 A | * | 3/2021 | ............. B60R 11/02 |

OTHER PUBLICATIONS

Machine translation of the description of CN-106570452-A, Fan et al., Apr. 19, 2017 (Year: 2024).*

(Continued)

*Primary Examiner* — Erin M Piateski
*Assistant Examiner* — Jared C Bean
(74) *Attorney, Agent, or Firm* — NSIP Law

(57) ABSTRACT

Disclosed is a method for controlling a display viewing environment of occupants in a vehicle with occupant seats forming multiple rows. The method includes, in response to a result of a viewing state determination being that a first occupant of a first seat in a first row of the vehicle, and a second occupant of a second seat in a second row of the vehicle, are in a state of viewing a front display together, performing reclining or vertical level reduction of the first row seats in response to a determination that occupants of the first row seats and the second row seats are in the state of viewing the front display together, and determining whether view of the front display is secured at an eye level of the occupants of the second row seats.

14 Claims, 19 Drawing Sheets

(51) Int. Cl.
  *B60K 35/22* (2024.01)
  *B60K 35/65* (2024.01)
  *B60N 2/02* (2006.01)

(52) U.S. Cl.
  CPC ........ *B60K 35/65* (2024.01); *B60K 2360/149* (2024.01)

(58) Field of Classification Search
  CPC ...... B60N 2/20; B60N 2/0226; B60N 2/0229; B60N 2/0231; B60N 2/0233; B60N 2/0235; B60N 2/0237; B60N 2/0239; B60N 2/0241; B60N 2/0273; B60K 35/60; B60K 35/28; B60K 35/53; B60K 35/00; B60K 35/81; B60K 2360/149; B60K 35/22; B60K 35/10; B60K 35/65; B60K 35/90
  See application file for complete search history.

(56) References Cited

U.S. PATENT DOCUMENTS

| | | | | |
|---|---|---|---|---|
| 2018/0052494 A1* | 2/2018 | Coburn | ................ | G06F 1/1675 |
| 2018/0105070 A1* | 4/2018 | Dry | ................... | B60N 2/02246 |
| 2020/0339147 A1* | 10/2020 | Hayakawa | ............. | B60K 35/00 |
| 2023/0053743 A1* | 2/2023 | Ohno | .................. | B60K 35/658 |
| 2023/0365028 A1* | 11/2023 | Katsube | .................. | B60N 2/22 |

OTHER PUBLICATIONS

Machine translation of the description of CN-112462566-A, Jiao et al., Mar. 9, 2021 (Year: 2024).*

* cited by examiner (A)  (B)

(A)      (B)

METHOD AND SYSTEM FOR CONTROLLING DISPLAY VIEWING ENVIRONMENT IN VEHICLE

CROSS-REFERENCE TO RELATED APPLICATION

This application claims the benefit under 35 USC § 119(a) of Korean Patent Application No. 10-2022-0073416, filed on Jun. 16, 2022, in the Korean Intellectual Property Office, the entire disclosure of which is incorporated herein by reference for all purposes.

BACKGROUND

1. Field

The present disclosure relates to a method for identifying a state in which occupants are viewing a front display together and constructing a display environment to provide a customized service to each occupant.

2. Description of Related Art

Generally, various types of convenience structures are being provided by for vehicles based on a different purposes. Convenience structures that may meet needs of vehicle occupants (inclusive of a driver, a passenger, and a user) can be applied based on a travel environment or a purpose of each situation. However, conventional convenience structures only provide a general structure of a limited form, and thus, there may be a disappointment in terms of convenience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, is a method for controlling a display viewing environment of occupants in a vehicle with occupant seats forming multiple rows is provided. The method includes, in response to a result of a viewing state determination being that a first occupant of a first seat in a first row of the vehicle, and a second occupant of a second seat in a second row of the vehicle, are in a state of viewing a front display together, performing reclining or vertical level reduction of the first row seats in response to a determination that occupants of the first row seats and the second row seats are in the state of viewing the front display together, and determining whether view of the front display is secured at an eye level of the occupants of the second row seats.

The method may further include performing respective vertical level increase of the one or more second seats in response to a view of the front display at the eye level of the at least one second occupant being determined unsatisfactory.

The vehicle may be a purposed built vehicle (PBV) in which the at least one of the one or more first seats and at least one of the one or more second seats may include a respective occupant footrest.

The respective occupant footrest of the at least one of the one or more first seats may be additionally respectively extended forwardly from the at least one of the one or more first seats when the at least one of the one or more first seats is respectively reclined.

The occupant footrest of the at least one of the one or more first seats may be respectively rotated in a direction opposite to a direction of reclining rotation when the at least one of the one or more first seat is respectively reclined.

A respective headrest of the at least one of the one or more first seats may be rotated in a direction opposite to a direction of reclining rotation when the at least one of the one or more first seats is respectively reclined.

A respective neck support of the headrest of the at least one of the one or more first seats may protrude when the at least one of the one or more first seats is respectively reclined.

A respective armrest controller of the at least one of the one or more first seats may display a function of controlling a reclining-related operation when the at least one of the one or more first seats is respectively reclined.

The method may further include moving the first row seat in a first direction among left and right directions and moving the second row seat in a second direction opposite to the first direction among the left and right directions.

There may be two or more first seats and two or more second seats. The movement in the first direction and the movement in the second direction may be performed such that one of the two or more second seats is moved to be positioned at a spacing between seats in the first row.

There may be two or more first seats and two or more second seats respectively. At least two of the two or more first seats may be connected to each other to form a first group, and at least two of the two or more second seats may be connected to each other to form a second group. Seats of the first group may rotate in a first direction, and seats of the second group may rotate in a second direction opposite to the first direction. Each of the two or more first seats may rotate individually so as to be directed forward, and each of the two or more second seats may rotate individually so as to be directed forward.

The viewing state determination may be based on respective gaze recognition of the at least one first occupant and the at least one second occupant.

The front display may include a first display area for communicating with the outside, a second display area where a transparent mode and a specific widget display mode are switched based on a driving mode, and a third display area for displaying control information.

In another general aspect, here is provided a system for controlling a display viewing environment in a vehicle. The system includes a first row controller configured to, in response to result of a viewing state determination, by a central controller of the system, that at least one first occupant of one or more first seats, in a first row of the vehicle, and at least one second occupant of one or more second seats, in another row of the vehicle, are in a state of viewing a front display together, perform reclining or vertical level reduction of at least one of the one or more first seats. The system may also include a second row controller configured to control the one or more second seats based on determination, by the central controller, on whether view of the front display is secured at an eye level of the at least one second occupant.

In another general aspect, here is provided a purpose built vehicle (PBV) for providing a customized service to each occupant. The PBV may include first row seats, in a first row, and second row seats, in a second row, at the rear of the first row. The first row seats and second row seats are individually movable based on gaze directions of respective occupants. The PBV may include a front display including a plurality of partitioned display areas, a central display area among the partitioned display areas that may support display based on a common display mode, and a controller that controls one or more of the first row seats and the second row seats so as to secure view of the front display at an eye level of an occupant of the second row seats when the central display area of the front display operates in the common display mode.

Other features and aspects will be apparent from the following detailed description, the drawings, and the claims.

Figure 1:
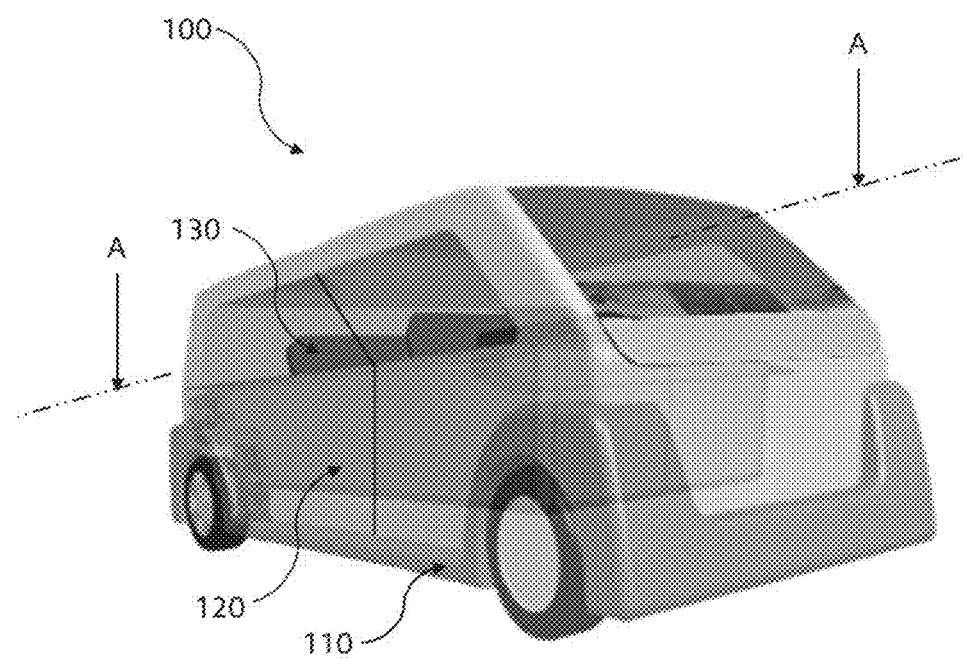
FIG. 1 is a diagram illustrating a PBV according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DESCRIPTION OF SPECIFIC EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating a PBV according to an embodiment of the present disclosure.

Referring to FIG. 1, a PBV 100 may include a skateboard 110, a cabin 120, and a seat 130 positioned within the cabin 120.

The skateboard 110 forms a bottom surface of a vehicle body.

The cabin 120 may be coupled to an upper end of the skateboard 110 so as to provide a boarding space and a separate storage space.

For example, because a vertical level of a bottom surface of the cabin 120 is low, the seat 130 must be adjusted high to a position where a visibility line is secured to secure visibility of a driver's seat. Therefore, the separate storage space may be secured beneath the seat 130 installed in the boarding space of the cabin 120.

Figure 2:
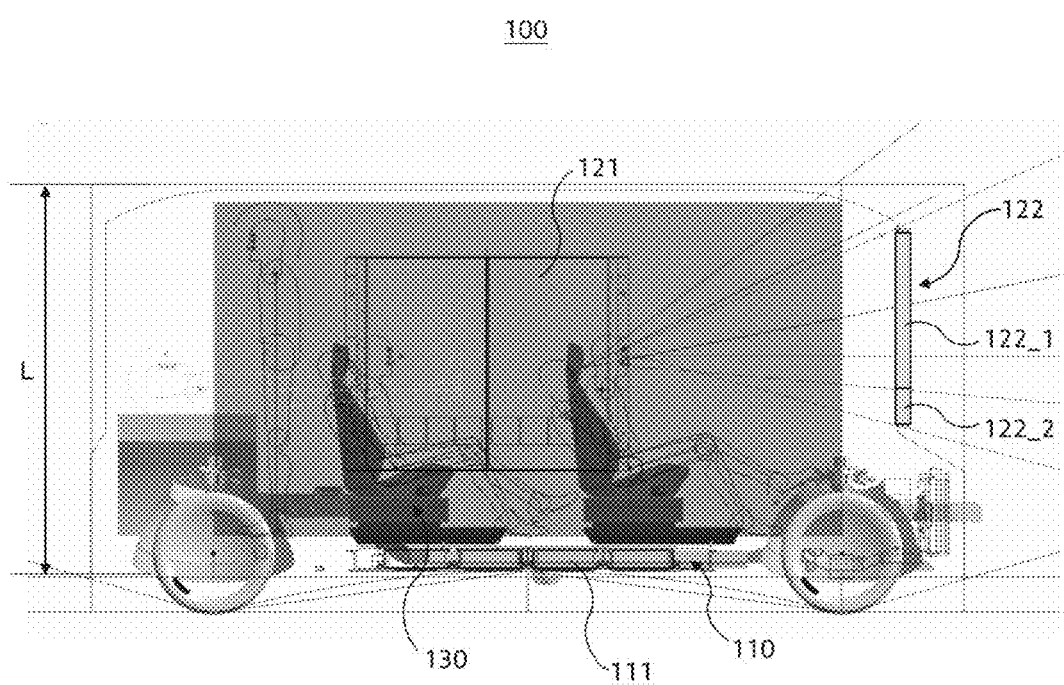
FIG. 2 is a side cross-sectional view illustrating a cross-section taken along a line A-A in FIG. 1.

FIG. 2 is a side cross-sectional view illustrating a cross-section taken along a line A-A in FIG. 1.

Referring to FIG. 2, the skateboard 110 may be provided with a battery mounting space 111. The battery mounting space 111 is preferably designed in consideration of installation and control precision of a battery (not shown).

It is preferable that the cabin 120 is constructed such that reclining of the seat 130 is able to be adjusted and the seat 130 is able to be rotated by itself for convenience of the occupant. In particular, an overall height L of the cabin 120 may be designed to be a height for the occupants to stand comfortably.

In this regard, the cabin 120 may be able to adjust the overall height L under separate control.

A side display 121 installed in the cabin 120 may transmit entertainment screens and other information images for infotainment on a screen.

A windshield 122 may have a display form that selectively displays images toward inside and outside of the vehicle.

The windshield 122 may include an electrochromic image area 122_1 and an opaque image area 122_2.

A shade of the electrochromic image area 122_1 may be adjusted such that the image is selectively displayed toward the inside and the outside of the vehicle based on application of power.

The opaque image area 122_2 may extend to a lower end or an upper end of the electrochromic image area 122_1.

As another example, the windshield 122 may be divided into an internal display area and an external display area.

For example, the internal display area may display the image toward the inside of the vehicle, and the external display area may display the image toward the outside of the vehicle. In this regard, the internal and external display areas may have separate electricity application paths.

Figure 3:
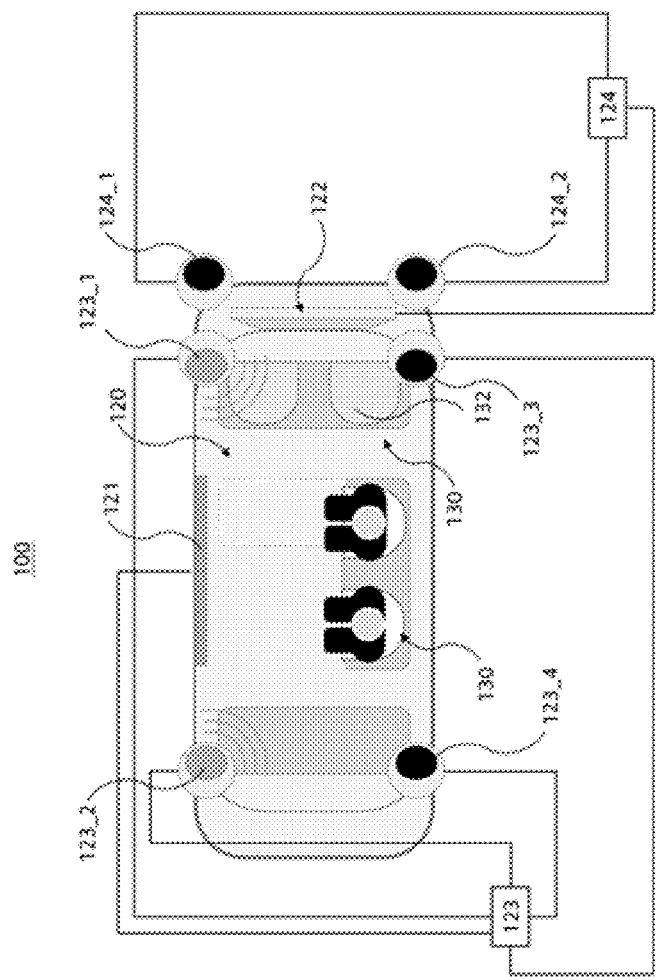
FIGS. 3 and 4 are plan sectional views illustrating a cross-section taken along a line A-A shown in FIG. 1.
Figure 4:
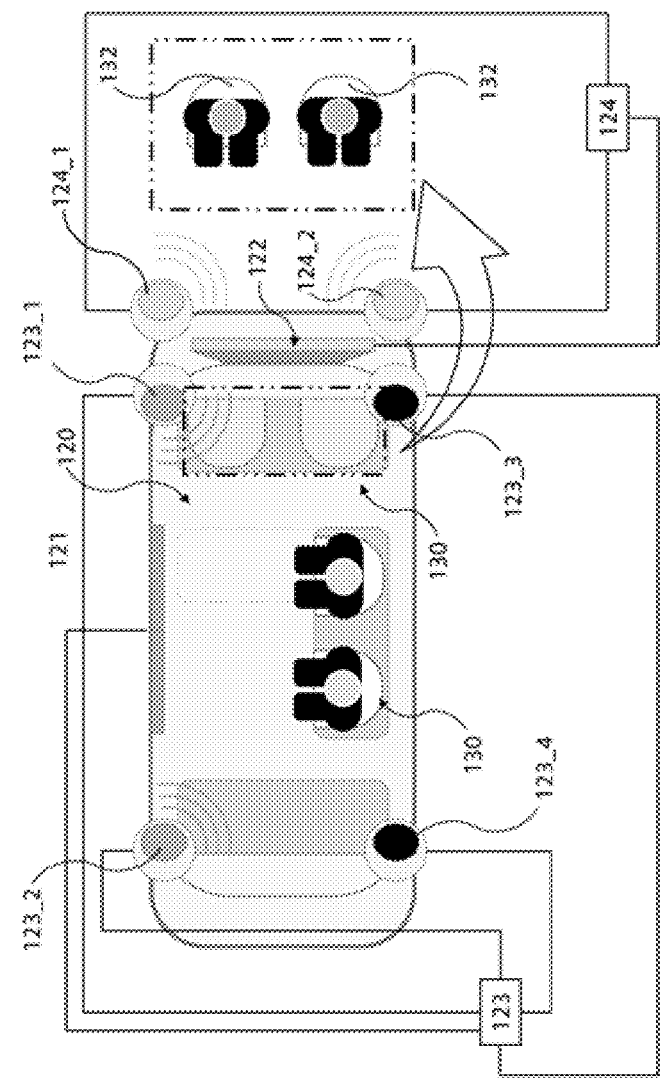

FIGS. 3 and 4 are plan sectional views illustrating a cross-section taken along a line A-A shown in FIG. 1.

FIG. 3 shows an example in which the occupant in the PBV 100 switches a driving mode of the PBV 100 to an autonomous driving mode, watches the image via the side display 121, and activates front and rear left speakers 123_1 and 123_2 among internal speakers 123.

A position of the seat 130 in each row may be adjusted as needed, so that the occupant may watch the corresponding image in a state in which the position of the seat 130 has been adjusted easily to a position opposite to the side display 121 installed inside the vehicle.

In this regard, the internal speakers 123 may provide sound from a plurality of interconnected speakers 123_1, 123_2, 123_3, and 123_4 based on control of the occupant and/or default settings.

FIG. 3 shows that two seats are arranged in each of a first row and a second row, and the seats in the first row are both rotated to watch the image via the side display 121, and that the seats in the second row are arranged at a position facing the front. As such, when each of the first row and the second row includes the two seats and the seats in each row move as a group, there is an advantage of simplification in terms of control of the seats.

The present disclosure does not need to be limited to such form, but a description will be made assuming that the seats are controlled in units of rows as described above for convenience of illustration in the following description.

Referring to FIG. 4, in addition to the situation in FIG. 3, the occupant may watch an external image of the windshield 122 after separately removing a seating portion of the seat 130 and fitting the corresponding seating portion to the outside of the vehicle.

In this regard, external speakers 124 may provide sound from a plurality of interconnected speakers 124_1 and 124_2 under control of the occupant and/or default settings.

Figure 5:
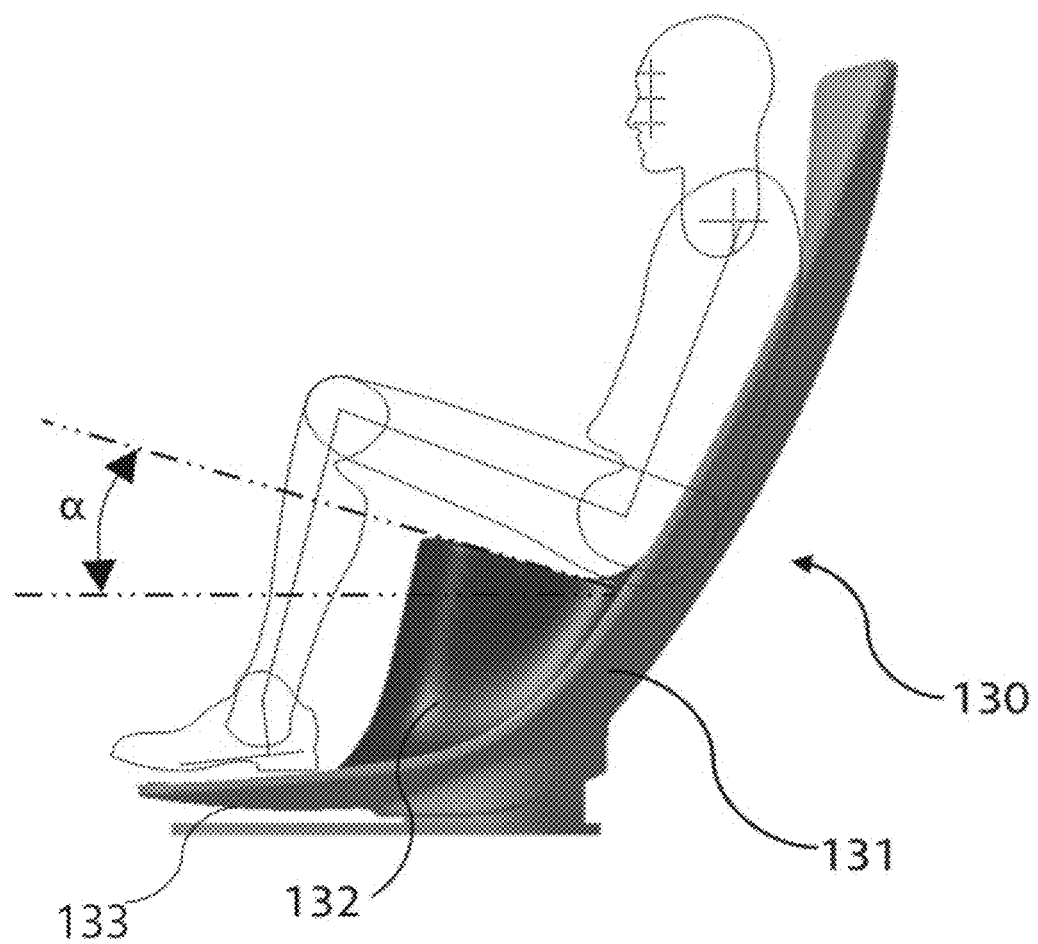
FIG. 5 is a diagram illustrating a seat structure in a PBV according to an embodiment of the present disclosure.

FIG. 5 is a diagram illustrating a seat structure in a PBV according to an embodiment of the present disclosure.

Referring to FIG. 5, the seat 130 may include a frame 131, a seating portion 132, and a footrest 133.

The frame 131 may be rotated by itself and may be adjusted in reclining. The frame 131 may adjust a headrest as well as a lumbar support.

In addition, the frame 131 may not only be rotated by itself, but also be adjusted in a vertical level by a predetermined angle α or be adjusted in a front and rear direction by a predetermined length.

The frame 131 may be in association with an ECU (not shown) that may be synchronized with big data, and transmit a weight applied to the seating portion 132 to the ECU. The ECU may compare the corresponding weight with statistical information accumulated in the big data, and then, use a result value of the comparison to adjust a position of the frame 131 or allow the occupant to check the corresponding information via the display and select the position.

As another example, the frame 131 may be adjusted in the position along a rail (not shown) installed in the cabin 120.

The seating portion 132 may be snap-fitted to the frame 131 to provide a seating space.

The seating portion 132 may have a foldable structure that may be fitted in any space after being removed from the frame 131 of the seat 130.

A top surface of the seating portion 132 may have an upwardly inclined curved structure in a forward direction. A side surface of the seating portion 132 may be formed of an outwardly expanding curved structure in a downward direction such that a calf of the user may be seated thereon.

The seating portion 132 is preferably made of a high rigidity plastic carbon fiber reinforced plastic (CFRP) material to ensure rigidity.

In addition, the seating portion 132 may have an integral structure in which three surfaces are connected to each other.

The seating portion 132 may have each of a plurality of ribs disposed for each section of some internal sections so as to secure the rigidity more.

As another example, the seating portion 132 may have an inner surface of a honeycomb structure so as to secure the rigidity.

The seating portion 132 may include a cushioning member (not shown) capable of absorbing impact on an edge thereof in contact with the frame 131. In this regard, the cushioning member may be fastened along an inner edge of the seating portion 132, and impact between the seating portion 132 and the frame 131 may be mitigated by offsetting a weight of the occupant when the occupant sits in the seating portion 132.

In one example, it is proposed that the seat 130 according to one embodiment of the present disclosure additionally includes a footrest 133 that may support feet of the occupant.

The reason that the seat 130 additionally includes the footrest 133 on which the feet of the occupant may be placed is because the occupant may experience inconvenience during the movement, such as the rotation, in a vehicle environment in which the seat 130 may be rotated depending on boarding of the occupant or a display direction when the feet of the passenger are in contact with the cabin bottom surface.

Accordingly, it is preferable that, during the movement, such as the rotation, of the seat 130, the seating portion 132, the frame 131, and the footrest 133 are integrated to perform the movement, such as the rotation.

Hereinafter, a technology for providing various display environments to the occupants under the PBV environment as described above, in particular, a technology for identifying a state in which the occupants are viewing a front display together and constructing a display environment therefor will be described. In the following description, the vehicle will be described by being assumed to be the PBV for convenience of illustration, but as long as a scheme that provides an optimal display environment in the state in which the occupants are viewing the front display together may be applied, the present disclosure is not necessary to be limited thereto and is able to be applied to various vehicles or means of transportation.

Figure 6:
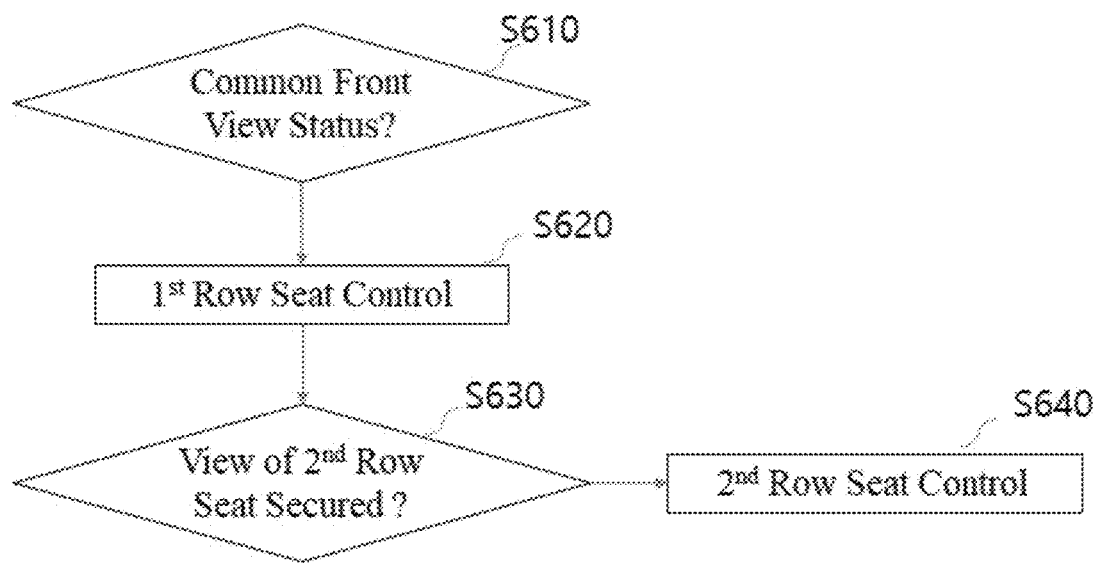
FIG. 6 is a diagram for illustrating a method for providing a display viewing environment according to an embodiment of the present disclosure.

FIG. 6 is a diagram for illustrating a method for providing a display viewing environment according to an embodiment of the present disclosure.

First, in the method according to the present embodiment, whether the occupants of the first row seats and the occupants of the second row seats behind the first row seats are in the state of viewing the front display together is determined (S610). As described above, the occupants in the vehicle may selectively view the side display 121 or the front display 122, and depending on the occupants, the occupants may not specifically watch/view the displays 121 and 122. However, the method according to the present embodiment will be described assuming a situation operated by determining whether the occupants are in the state of viewing the front display together based on one or more of gaze tracking of the occupants, a state of the display, and an arrangement of the seats.

In the present embodiment, when the occupants are in the state of viewing the front display together, first row seat control including reclining and/or vertical level reduction of the first row seats may be performed (S620).

After performing such first row seat control, it is proposed to determine (S630) whether view of a front display 122 is secured at an eye level of the occupants of the second row seats.

When it is difficult (for example, unsatisfactory from the viewers viewpoint) to secure the view of the front display 122 at the eye level of the occupants of the second row seats, second row seat control, such as an increase in a vertical level of the second row seats, may be additionally performed (S640).

Hereinafter, such method will be described in detail through an example applied to the PBV environment.

Figure 7:
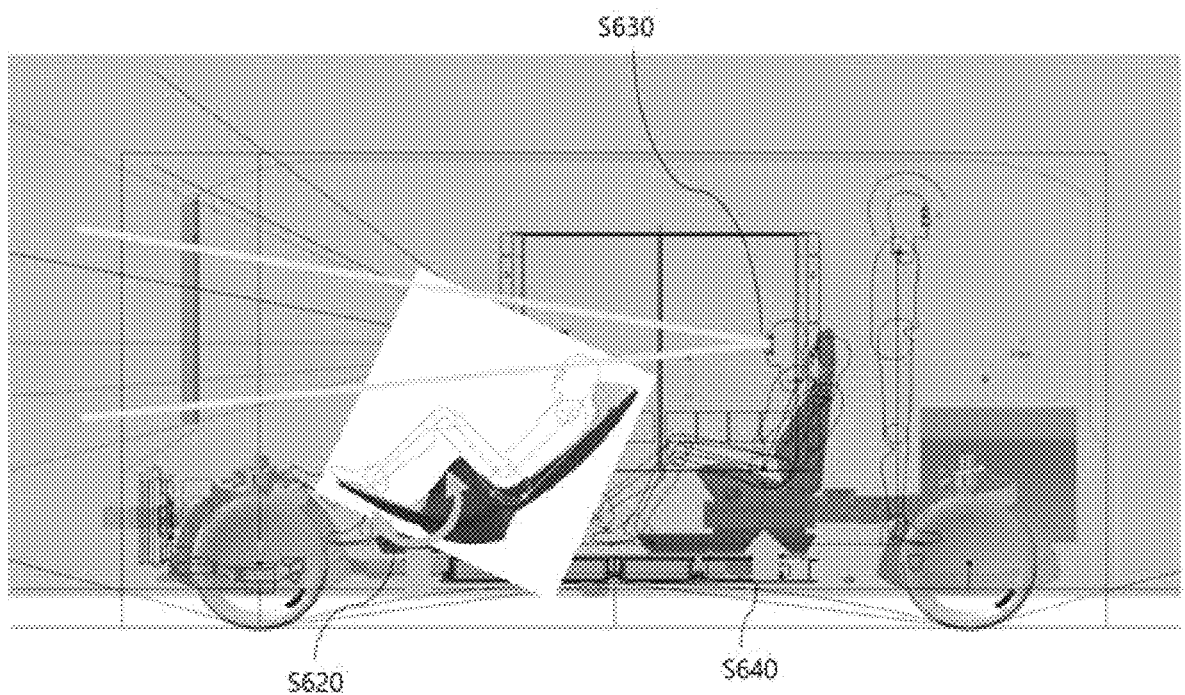
FIG. 7 is a diagram for illustrating a scheme for controlling a display viewing environment in a PBV according to an embodiment of the present disclosure.

FIG. 7 is a diagram for illustrating a scheme for controlling a display viewing environment in a PBV according to an embodiment of the present disclosure.

Referring to FIG. 7, it is assumed that both the occupants of the first row seats and the occupants of the second row seats are determined to view the front display. As such, in the situation in which the occupants are viewing the front display together, the first row seats may be reclined and/or descended (S620) so as to secure the view of the front display such that the occupants of the second row seats may view the front display (S630).

When the second row occupants, such as an infant, have low fields of vision in a sitting position, it may be recognized via gaze tracking of the rear seat occupants or the like that the fields of vision of the second row occupants are not secured, and ascending of the second row seats or the like may be additionally performed (S640).

Figure 8:
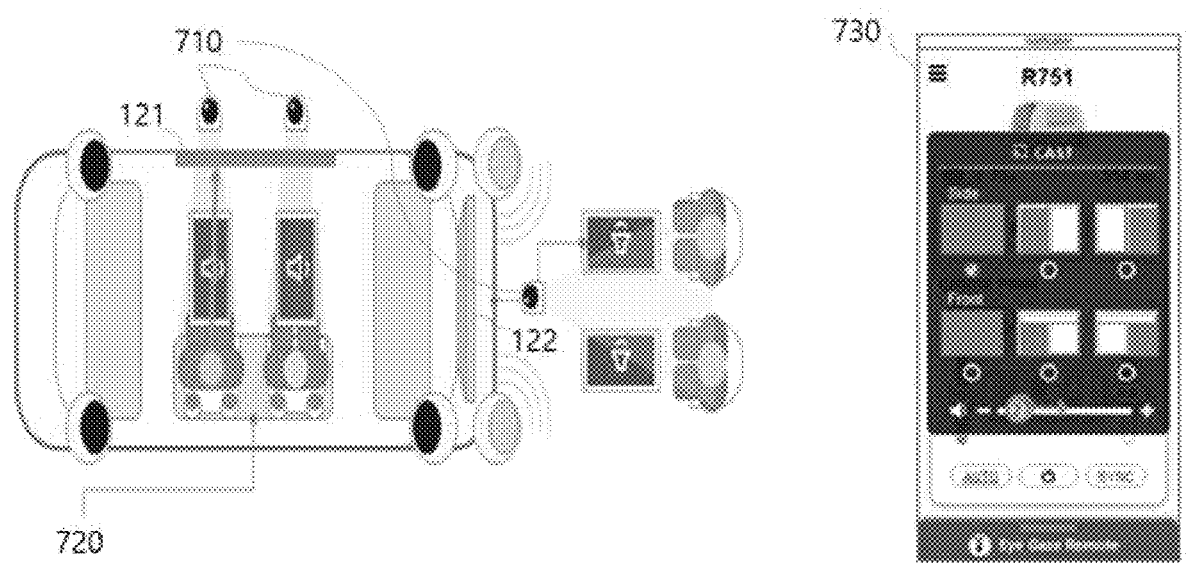
FIGS. 8 and 9 are diagrams for illustrating a scheme for determining a situation in which occupants are viewing a front display together according to an embodiment of the present disclosure.
Figure 9:
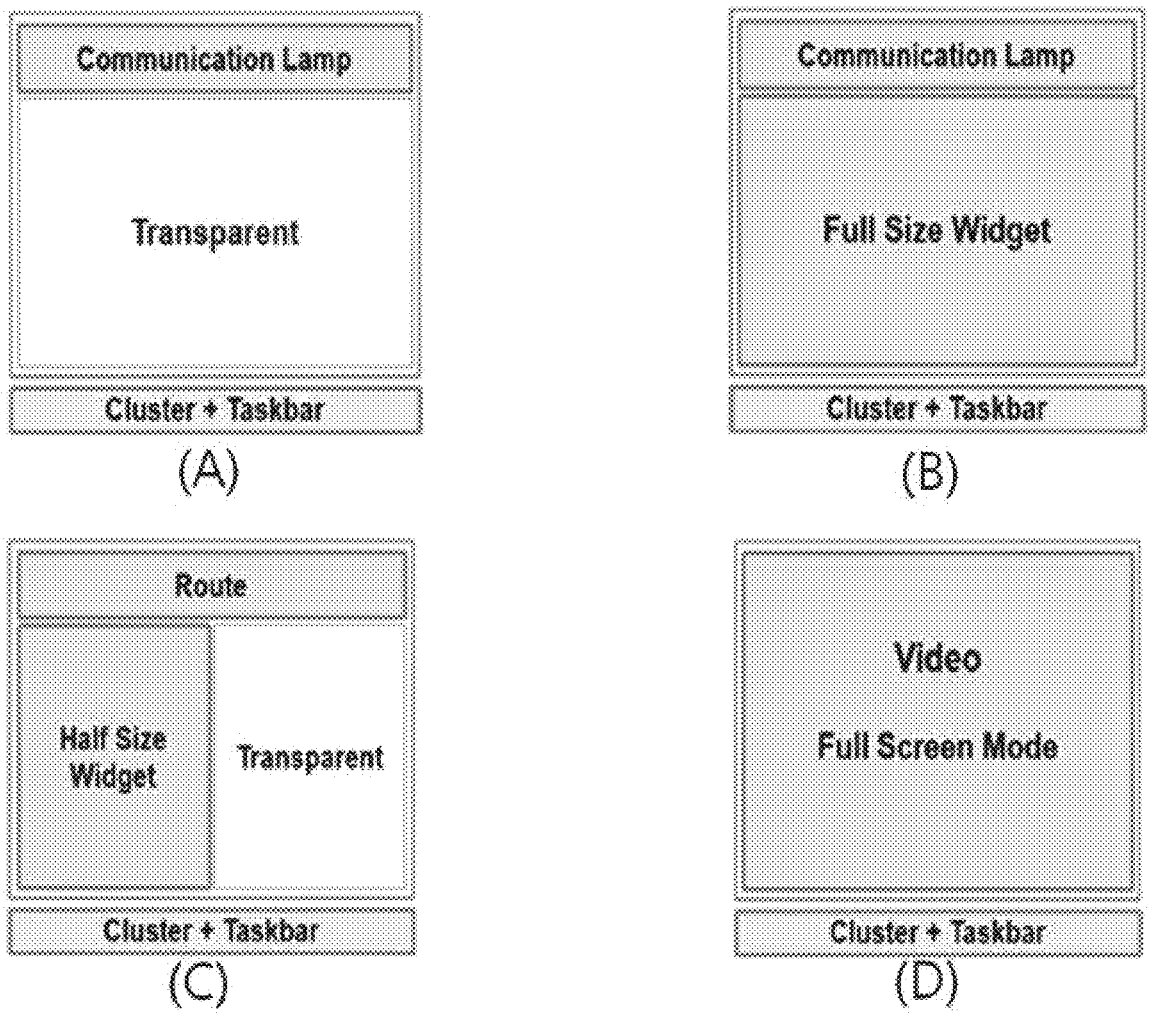

FIGS. 8 and 9 are diagrams for illustrating a scheme for determining a situation in which occupants are viewing a front display together according to an embodiment of the present disclosure.

Because the PBV aims to provide a service tailored to individual requirements of each occupant, various services may be provided for each occupant as shown at a left side of FIG. 8. Specifically, the left side of FIG. 8 shows a state in which occupants of one row of seats 720 watch the image of the side display 121 and occupants of the other row of seats watch the external image of the front display 122 from outside the PBV.

A situation of each occupant may be automatically adjusted via occupant gaze tracking of an gaze tracking camera 710. That is, it may be set via the gaze tracking camera 710 that the image viewed by the occupant is displayed on the display viewed by the corresponding occupant, and when the display viewed by the corresponding occupant is changed, the change is automatically recognized and the image is moved to another display.

In another embodiment, as shown at a right side of FIG. 8, a display type in the PBV may be changed via an application 730 of a user terminal. For example, as shown at the right side of FIG. 8, the side display/front display may be selected via the application 730 and display the image, and a screen division scheme or the like may be selected in the front/side display as well.

In one example, the display environment may be controlled in a scheme in which both are combined with each other. For example, when activating an automatic adjustment function at a lower end in the application 730 shown at the right side of FIG. 8, it may be controlled to automatically select the display on which the image is displayed based on a gaze direction of the occupant recognized via the gaze tracking camera 710.

As described above in relation to FIG. 6, the determination on whether the occupants are viewing the front display together may be made automatically based on the above-described gaze recognition or may be made via the control on the application 730 by the occupant.

In one example, referring to FIG. 9, the front display may be divided into several display areas. For example, it may be set that the front display shown in FIG. 9 includes a first display area for communicating with the outside (e.g., a communication lamp in (A) to (B) in FIG. 9), a second display area in which a transparent mode and a specific widget display mode are switched based on the driving mode (e.g., a transparent area in (A) in FIG. 9, a full size widget area in (B) in FIG. 9, and the like), and a third display area displaying control information (e.g., a cluster+taskbar area in (A) to (D) in FIG. 9).

In such example, the state of viewing the front display together described above with respect to FIG. 6 may be determined based on whether the second display area is operated in the specific widget display mode (e.g., (B) and (D) in FIG. 9). That is, when the second display area is in the transparent mode for observing an external environment as shown in (A) in FIG. 9 or when the second display area displays an only half-sized widget and the other half of the second display operates in the transparent mode so as to provide different services for the occupants as shown in (C) in FIG. 9, it may be determined that the occupants are not in the state of viewing the front display together.

Figure 10:
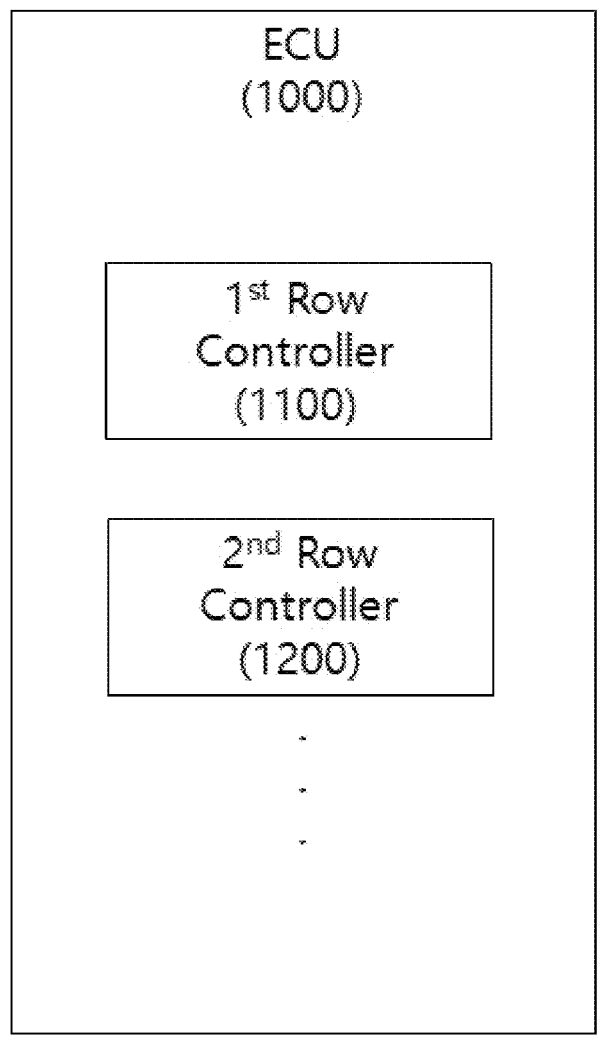
FIG. 10 is a diagram for illustrating a concept of a system for controlling a display viewing environment of occupants according to an embodiment of the present disclosure.

FIG. 10 is a diagram for illustrating a concept of a system for controlling a display viewing environment of occupants according to an embodiment of the present disclosure.

As shown in FIG. 10, the system according to the present embodiment may include a central controller, a first row controller 1100, and a second row controller 1200. The central controller may integrate and manage the first row controller 1100 and the second row controller 1200 in a form of an ECU 1000 as shown in FIG. 10.

As described above, the plurality of first row seats and the plurality of second row seats may be included. It is assumed that each of the first row controller 1100 and the second row controller 1200 collectively controls the seats in each row, but includes separate control logic for each seat.

Based on the same, the ECU 1000 may be set to determine whether the occupants of the first row seats and the occupants of the second row seats are in the state of viewing the front display together via gaze tracking camera information and/or user application information.

When it is determined that the occupants are in the state of viewing the front display together as such, the first row controller 1100 may control the performing of the reclining and/or the vertical level reduction of the first row seat. When there are the plurality of first row seats, the plurality of first row seats may be reclined by a predetermined angle, but when there is a tall occupant among the occupants in the first row seats and there is difficulty in securing a gaze of the first row occupant, it may be controlled that the vertical level reduction is performed only for a specific seat among the first row seats.

In one example, the second row controller 1200 may control the second row seats based on the ECU 1000 determining whether the view of the front display is secured at the eye level of the occupants of the second row seats. When there are the plurality of second row seats, it may be controlled that vertical levels of such seats are increased at once, and when the infant is in a specific seat among the second row seats and the view of the front display is not secured, it may also be controlled that only a vertical level of the corresponding specific seat is increased.

Hereinabove, the description has been made with the simplified situation in which the first row and the second row behind the first row exist in the PBV, but additional rows (e.g., a third row, a fourth row, and the like) may be formed in the seats in the PBV. However, in the above description, the first row and the second row behind the first row are concepts shown to illustrate a relationship between the seats of the row positioned in the front and the seats of the row at the rear (for example, behind). Accordingly, when the additional rows exist, additional including of a third row controller (not shown), a fourth row controller (not shown), and the like is not excluded. However, for convenience of illustration, the row in the front will be simplified as the first row and the row at the rear will be simplified as the second row.

Figure 11:
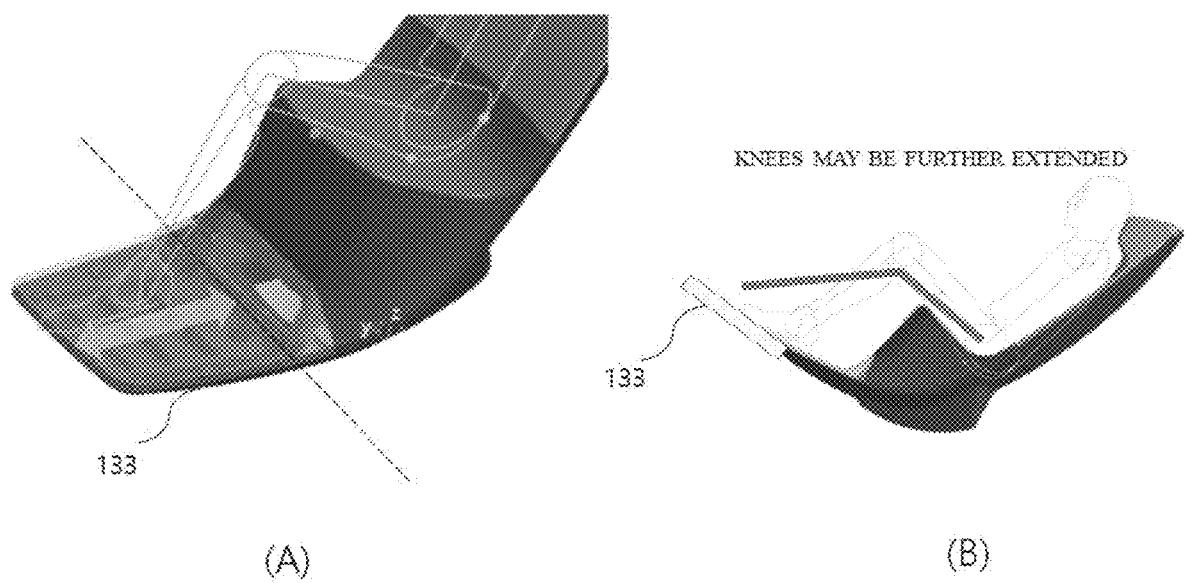
FIGS. 11 to 13 are diagrams for illustrating a method of controlling a footrest of a seat according to a preferred embodiment of the present disclosure.
Figure 12:
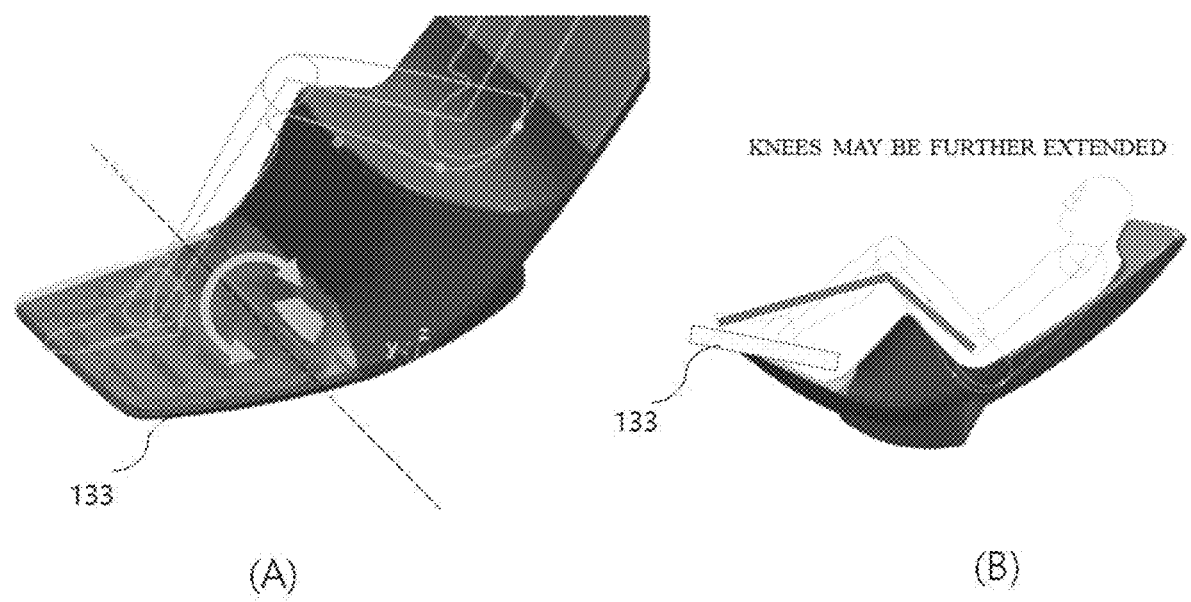
Figure 13:
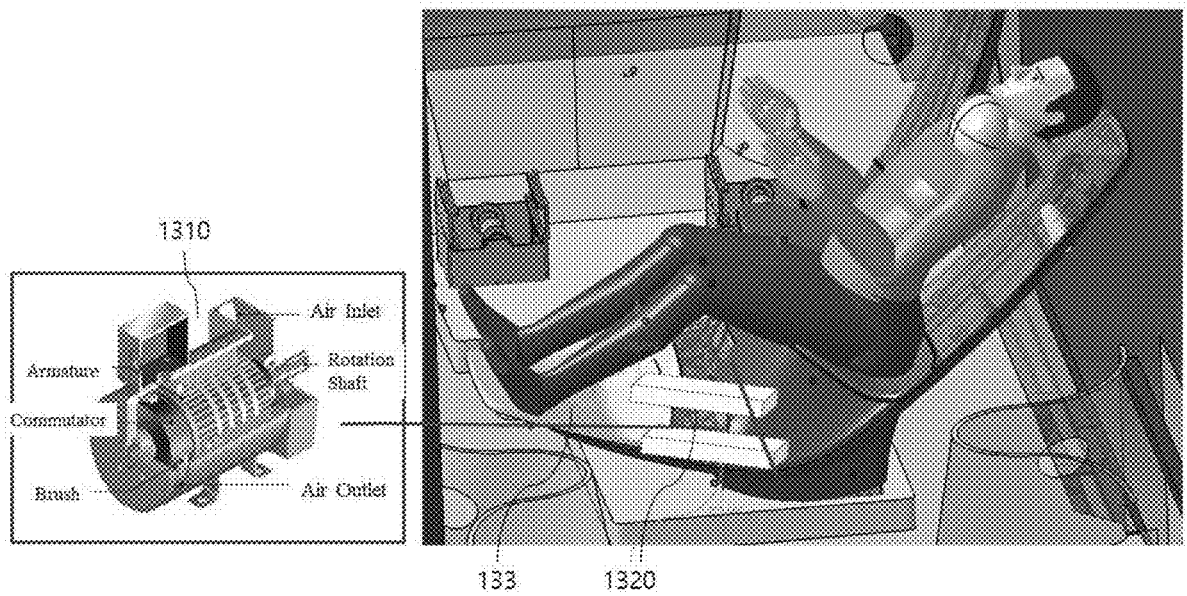

FIGS. 11 to 13 are diagrams for illustrating a method of controlling a footrest of a seat according to a preferred embodiment of the present disclosure.

As described above in relation to FIG. 5, it is preferable that the seats in the PBV include the footrest 133 in order to eliminate the inconvenience that the feet of the occupants interfere with the cabin bottom surface when the seats are moved.

In this regard, FIG. 11 shows a concept in which the footrest 133 is additionally extended ((A) in FIG. 11) during the reclining of the first row seat, and controlled such that an occupant of the corresponding seat may further extend knees ((B) in FIG. 11).

In one example, FIG. 12 shows a concept in which an outer portion of the footrest 133 is rotated by a predetermined angle in a direction of the cabin bottom surface during the reclining of the first row seat ((A) in FIG. 12), and controlled such that an occupant of the corresponding seat may further extend knees ((B) in FIG. 12). That is, it is preferable that the outer portion of the footrest 133 of the reclined seat is set to rotate in a direction opposite to that of the rotation for the reclining, and controlled such that the occupant of the corresponding seat views the front display more comfortably.

FIG. 13 shows a configuration for driving the footrest 133 when the footrest 133 of the reclined seat is additionally extended as described above.

That is, a rotation torque of the motor 1310 as shown at a left side of FIG. 13 may be transmitted to the footrest 133 via a rail 1320. Accordingly, the footrest 133 may be controlled to be extended by a predetermined distance. In a preferred embodiment, an additional extension level of the footrest 133 is preferably 150 mm, but the present disclosure does not need to be limited thereto.

Figure 14:
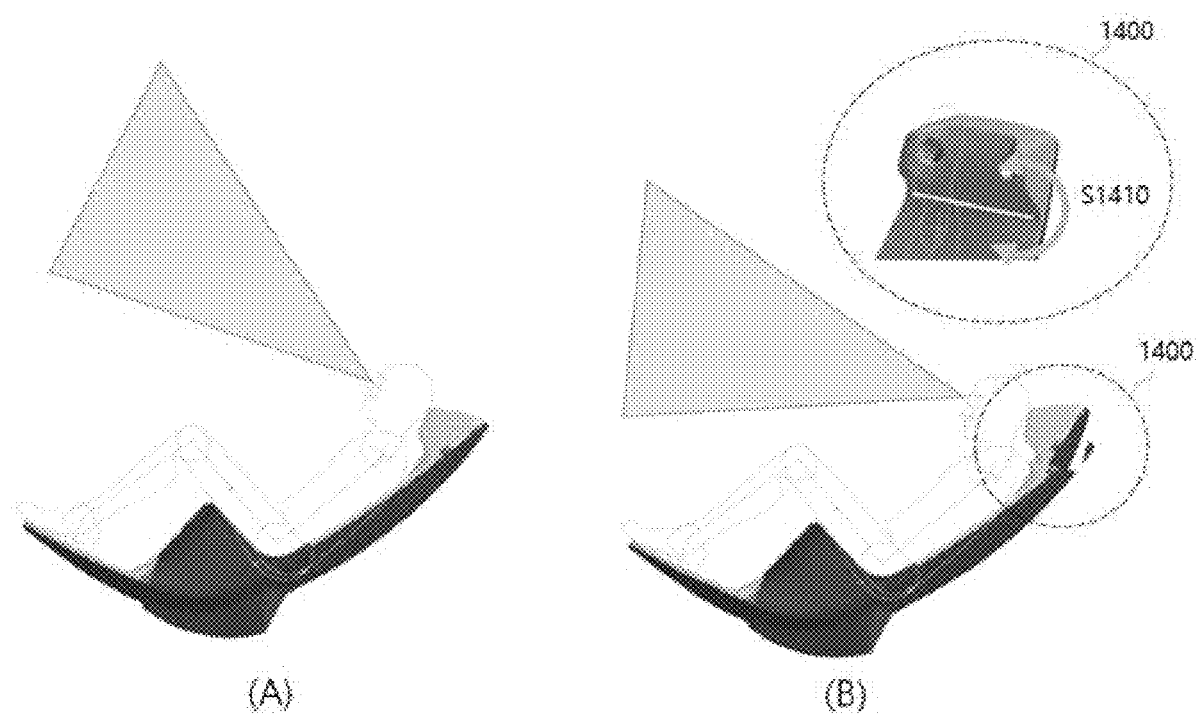
FIGS. 14 to 16 are diagrams for illustrating a scheme for controlling a headrest during reclining of a seat according to an embodiment of the present disclosure.
Figure 15:
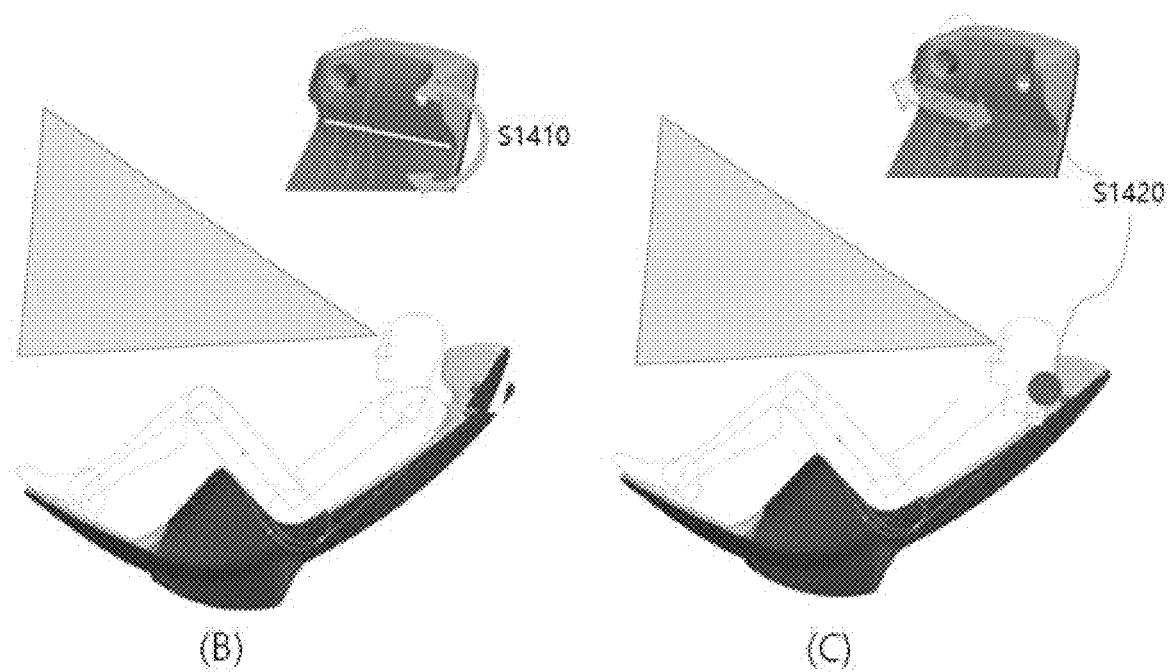
Figure 16:
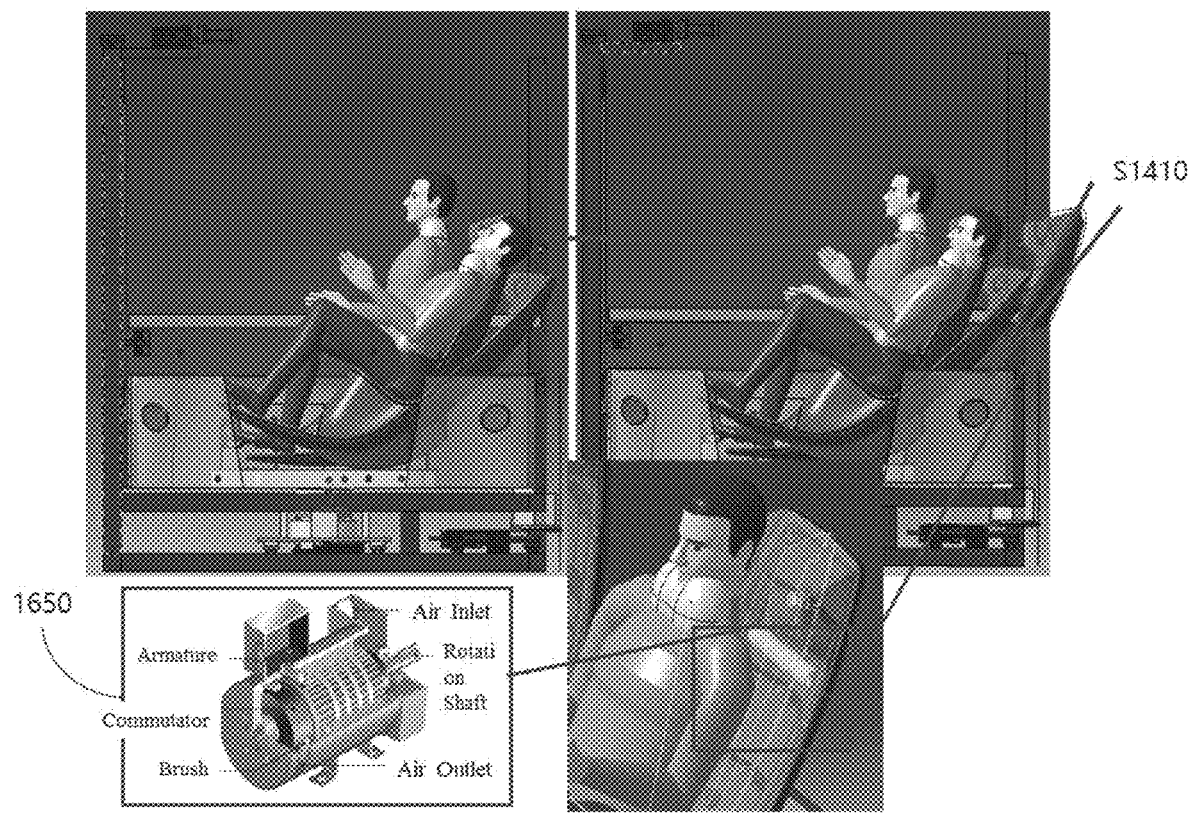

FIGS. 14 to 16 are diagrams for illustrating a scheme for controlling a headrest during reclining of a seat according to an embodiment of the present disclosure.

As shown in (A) in FIG. 14, in a state in which a head of the occupant is supported on a headrest 1400, during the reclining of the seat, it may be inconvenient for the occupant to stare at front. To this end, in one embodiment of the present disclosure, it is proposed that, during the reclining of the seat, as shown in (B) in FIG. 14, the headrest of the corresponding seat is rotated in a direction opposite to that of the reclining rotation (S1410), and controlled such that the occupant may comfortably stare at front while the head thereof is supported on the headrest. To this end, the hinge rotation of the headrest 1400 may be controlled by keeping pace with the reclining of the seat, and an angle of rotation of the headrest 1400 may also be controlled via the gaze recognition of the occupant.

However, when the headrest is rotated to allow the occupant to stare at front in the seat reclined as shown in (B) in FIG. 15 (S1410), there is a problem that a space may be defined between a neck of the occupant and the seat, which may cause inconvenience. Therefore, in one embodiment of the present disclosure, it is proposed that, when the seat is reclined as shown in (C) in FIG. 15, a neck support of the headrest of the corresponding seat is controlled to protrude (S1420) so as to reduce a burden on the neck of the occupant.

Referring to FIG. 16, the control of rotating the headrest during the reclining of the seat (S1410) as described above may be performed by controlling driving of a motor 1650. That is, a rotation torque of motor 1650 may be implemented by the hinge rotation of the headrest of the seat.

Figure 17:
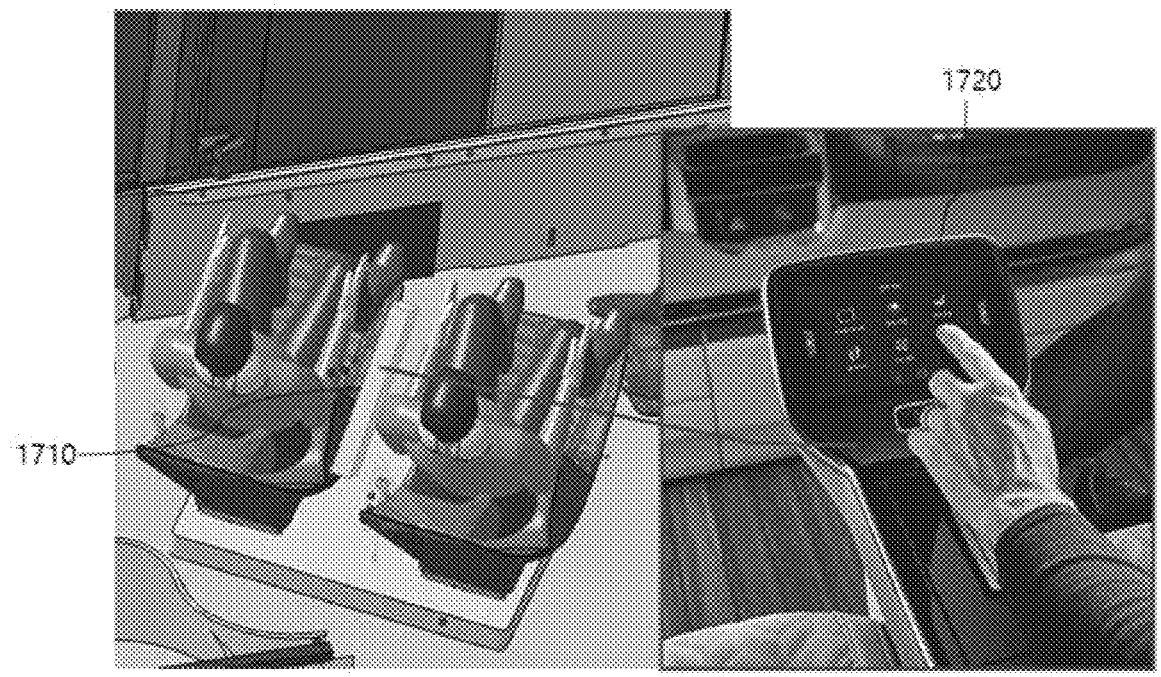
FIG. 17 is a diagram for illustrating a configuration of an armrest for facilitating manipulation of occupants during reclining of a seat according to an embodiment of the present disclosure.

FIG. 17 is a diagram for illustrating a configuration of an armrest for facilitating manipulation of occupants during reclining of a seat according to an embodiment of the present disclosure.

The reclining of the seat may be automatically applied based on the determination on whether the occupants are in the state of viewing the front display together as described above. However, depending on the occupant, the reclined seat may feel uncomfortable, so that means for such occupant to easily control a reclining state or the like of the seat may be required.

In an embodiment in FIG. 17, an armrest controller 1720 may be included on an armrest 1710 of the seat so as to control a reclining-related operation of the seat. For example, a reclining angle of the corresponding seat may be controlled, and the headrest and the neck support may be controlled as described above with reference to FIGS. 14 to 16.

In addition, the armrest controller 1720 described above may additionally include a control function for convenience functions such as the display environment in the PBV, an air conditioning system, as well as the control for the seat.

Figure 18:
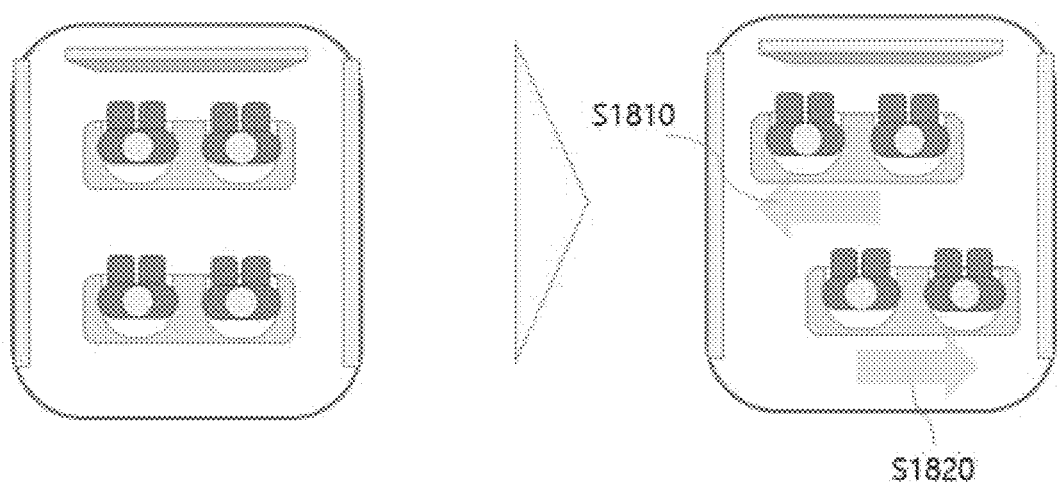
FIGS. 18 and 19 are diagrams for illustrating a method for controlling a position of a seat in a vehicle according to an embodiment of the present disclosure.
Figure 19:
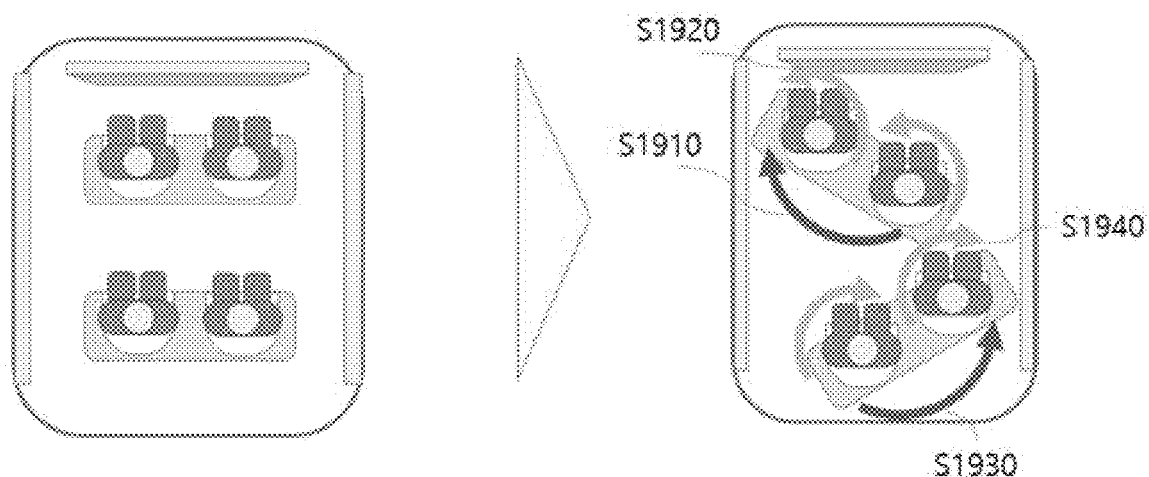

FIGS. 18 and 19 are diagrams for illustrating a method for controlling a position of a seat in a vehicle according to an embodiment of the present disclosure.

When the occupants are in the state of viewing the front display together as described above, the reclining/descending of the first row seats and the ascending of the second row seats may cause inconvenience for the occupant. In addition, the field of vision of the occupant may be secured more perfectly additionally using schemes in FIGS. 18 and 19 in addition to the seat control as described above.

First, in an embodiment in FIG. 18, the seats of the first row are moved in a first direction among left and right directions (S1810), and the seats of the second row are moved in a second direction opposite to the first direction among the left and right directions (S1820), so that fields of vision for viewing the front display of all of the occupants in the vehicle may be secured. In this regard, when each of the seats in the first row and the seats in the second row include two or more seats as shown in FIG. 18, it may be preferable that the first directional movement (S1810) and the second directional movement (S1820) are performed such that one of the seats in the second row is positioned at a spacing between the seats in the first row.

In addition, in an embodiment in FIG. 19, similarly to FIG. 18, it is proposed that, in a situation in which each of the seats of the first row and the seats of the second row include two or more seats connected to each other to form each of a first group of seats and a second group of seats, the first group of seats rotate in the first direction (S1910), and the second group of seats rotate in the second direction opposite to the first direction (S1930).

However, because it may be inconvenient for each seat to be directed forward during the seat rotation in units of rows as described above, each of the seats in the first row and the seats in the second row may be controlled to individually rotate (S1920 and S1940) to be directed forward. Therefore, it may be controlled such that fields of vision of the occupants of the second row seats for viewing the front display are also secured in spaces between the occupants of the first row seats.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

Various embodiments provide a technology for providing various display environments to occupants under a vehicle environment to provide a customized service to each occupant, and in particular, to provide a technology for identifying a state in which the occupants are viewing a front display together and constructing a display environment therefor.

In addition, the technology for providing the various display environments to the occupants under the vehicle environment to provide the customized service to each occupant may be provided. In particular, by identifying the state in which the occupants are viewing the front display together, the efficient display environment therefor may be constructed.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for controlling a display viewing environment of occupants in a vehicle with occupant seats forming a plurality of rows, the method comprising:
   in response to a result of a viewing state determination being that at least one first occupant of one or more first seats in a first row of the vehicle, and at least one second occupant of one or more second seats in a second row of the vehicle, are in a state of viewing a front display together;
   performing reclining or vertical level reduction of at least one of the one or more first seats;
   determining whether view of the front display is secured at an eye level of the at least one second occupant; and
   moving the at least one of the one or more first seats in a first direction among left and right directions and moving at least one of the one or more second seats in a second direction opposite to the first direction among the left and right directions.

2. The method of claim 1, further comprising:
   performing respective vertical level increase of the one or more second seats in response to a view of the front display at the eye level of the at least one second occupant being determined to be unsatisfactory.

3. The method of claim 1, wherein the vehicle is a purposed built vehicle (PBV), and
   wherein the at least one of the one or more first seats and at least one of the one or more second seats include a respective occupant footrest.

4. The method of claim 3, wherein the respective occupant footrest of the at least one of the one or more first seats further extends forwardly from the at least one of the one or more first seats when the at least one of the one or more first seats is reclined, respectively.

5. The method of claim 3, wherein the occupant footrest of the at least one of the one or more first seats is respectively rotated in a direction opposite to a direction of reclining rotation when the at least one of the one or more first seat is respectively reclined.

6. The method of claim 3, wherein a respective headrest of the at least one of the one or more first seats is rotated in a direction opposite to a direction of reclining rotation when the at least one of the one or more first seats is respectively reclined.

7. The method of claim 6, wherein a respective neck support of the headrest of the at least one of the one or more first seats protrudes when the at least one of the one or more first seats is respectively reclined.

8. The method of claim 1, wherein a respective armrest controller of the at least one of the one or more first seats displays a function of controlling a reclining-related operation when the at least one of the one or more first seats is respectively reclined.

9. The method of claim 1, wherein there are two or more first seats and two or more second seats, and
   wherein a movement in the first direction and a movement in the second direction are performed such that one of the two or more second seats is moved to be positioned at a spacing between seats in the first row.

10. The method of claim 1, wherein, when there are two or more first seats and two or more second seats respectively, at least two of the two or more first seats are connected to each other to form a first group and at least two of the two or more second seats are connected to each other to form a second group,
    wherein seats of the first group rotate in a first direction, and seats of the second group rotate in a second direction opposite to the first direction, and
    wherein each of the two or more first seats is configured to rotate individually to face forwards, and each of the two or more second seats is configured to rotate individually to face forwards.

11. The method of claim 1, wherein the viewing state determination is based on respective gaze recognition of the at least one first occupant and the at least one second occupant.

12. The method of claim 1, wherein the front display includes a first display area for communicating with the outside, a second display area where a transparent mode and a specific widget display mode are switched depending on a driving mode, and a third display area for displaying control information.

13. A system for controlling a display viewing environment of occupants in a vehicle with occupant seats forming a plurality of rows, the system comprising:
    a first row controller configured to perform reclining or vertical level reduction of at least one of one or more first seats, in response to result of a viewing state determination, by a central controller of the system, that at least one first occupant of the one or more first seats; in a first row of the vehicle, and at least one second occupant of one or more second seats; in another row of the vehicle, are in a state of viewing a front display together; and
    a second row controller configured to control the one or more second seats based on determination, by the central controller, on whether view of the front display is secured at an eye level of the at least one second occupant,
    wherein, when there are two or more first seats and two or more second seats respectively, at least two of the two or more first seats are connected to each other to form a first group and at least two of the two or more second seats are connected to each other to form a second group,
    wherein seats of the first group rotate in a first direction, and seats of the second group rotate in a second direction opposite to the first direction, and
    wherein each of the two or more first seats is configured to rotate individually to face forwards, and each of the two or more second seats is configured to rotate individually to face forwards.

14. A purpose built vehicle (PBV) for providing a customized service to each occupant, the PBV comprising:
    first row seats, in a first row, and second row seats, in a second row behind the first row, wherein the first row seats and the second row seats are individually movable based on gaze directions of respective occupants;

a front display including a plurality of partitioned display areas, wherein a central display area among the plurality of partitioned display areas supports a display based on a common display mode; and a controller configured to control at least one seat of the first row seats and the second row seats so as to secure a view of the front display at an eye level of at least one occupant of the second row seats when the central display area of the front display operates in the common display mode, wherein the controller is further configured to move the at least one seat of the first row seats in a first direction among left and right directions, and move the at least one seat of the second row seats in a second direction opposite to the first direction among the left and right directions.

* * * * *